US012742630B2

(12) United States Patent
Park et al.

(10) Patent No.: US 12,742,630 B2
(45) Date of Patent: Sep. 22, 2026

(54) SYSTEM AND METHOD FOR HIGH-RESOLUTION REFLECTION TOMOGRAPHIC IMAGING

(71) Applicants: Korea Advanced Institute of Science and Technology, Daejeon (KR); Tomocube, Inc., Daejeon (KR)

(72) Inventors: YongKeun Park, Daejeon (KR); Herve Jerome Hugonnet, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 101 days.

(21) Appl. No.: 18/797,357

(22) Filed: Aug. 7, 2024

(65) Prior Publication Data

US 2025/0052560 A1 Feb. 13, 2025

(30) Foreign Application Priority Data

Aug. 11, 2023 (KR) ........................ 10-2023-0105750

(51) Int. Cl.

| | |
|---|---|
| ***G01B 9/02*** | (2022.01) |
| ***G01B 9/02091*** | (2022.01) |
| ***H04N 13/207*** | (2018.01) |

(52) U.S. Cl.
CPC ..... *G01B 9/02091* (2013.01); *G01B 9/02041* (2013.01); *H04N 13/207* (2018.05)

(58) Field of Classification Search
CPC ............ G01B 9/02091; G01B 9/02041; G01B 9/02015; G01B 9/02032; G01B 9/04; G01B 9/02059; G01B 9/02083; G01B 11/2441; G01B 2210/56; H04N 13/207; G01N 21/4795; G01N 2021/1787; G01N 21/27;

(Continued)

(56) References Cited

U.S. PATENT DOCUMENTS

| | | | | |
|---|---|---|---|---|
| 6,208,415 | B1 | 3/2001 | De Boer et al. | |
| 8,687,253 | B2 * | 4/2014 | Yu | G03H 1/0443 359/22 |

(Continued)

FOREIGN PATENT DOCUMENTS

| | | |
|---|---|---|
| CN | 104483291 A | 4/2015 |
| CN | 111157486 A | 5/2020 |

(Continued)

OTHER PUBLICATIONS

Edwards, C., B. Bhaduri, B. G. Griffin, L. L. Goddard, and G. Popescu. "Epi-illumination diffraction phase microscopy with white light." Optics letters 39, No. 21 (2014): 6162-6165.

(Continued)

*Primary Examiner* — Isiaka O Akanbi
(74) *Attorney, Agent, or Firm* — Lee & Hayes, P.C.

(57) ABSTRACT

Provided is a high-resolution reflection tomographic imaging system and method. The high-resolution reflection tomographic imaging system of the present disclosure may include an objective lens, a tube lens, a camera, an illumination element configured to introduce temporally coherent and spatially incoherent light, and a semi-reflective surface element configured to split the light into a sample and a reference beam between the tube lens and the camera, such that a sample beam from the sample and the reference beam cause interference for tomographic imaging.

7 Claims, 8 Drawing Sheets

(58) Field of Classification Search
CPC .. G02B 21/0016; G02B 21/082; G02B 21/18; G03H 2001/0038; G03H 2001/0445; G03H 2001/0452; G03H 2222/23; G03H 2222/24; G03H 1/0443
USPC ........ 356/497, 495, 513, 503, 517, 512, 479
See application file for complete search history.

(56) References Cited

U.S. PATENT DOCUMENTS

| | | | | |
|---|---|---|---|---|
| 9,546,952 | B2 * | 1/2017 | Choi | G01N 21/51 |
| 10,831,012 | B2 * | 11/2020 | Carney | G02B 21/06 |
| 10,845,759 | B2 * | 11/2020 | Sung | G02B 21/14 |
| 11,921,045 | B2 * | 3/2024 | Matoba | G03H 1/06 |
| 12,098,920 | B2 | 9/2024 | Mase et al. | |
| 2007/0201033 | A1 * | 8/2007 | Desjardins | G01B 9/02091 356/497 |
| 2009/0125242 | A1 * | 5/2009 | Choi | G01N 21/51 702/19 |
| 2012/0086932 | A1 * | 4/2012 | Kim | G01S 17/10 356/5.01 |
| 2013/0148182 | A1 * | 6/2013 | Yu | G03H 1/0443 359/22 |
| 2013/0278922 | A1 * | 10/2013 | Gelernt | G02B 21/16 356/51 |
| 2015/0285685 | A1 | 10/2015 | Wax et al. | |
| 2022/0026697 | A1 | 1/2022 | Doblas | |

FOREIGN PATENT DOCUMENTS

| | | | |
|---|---|---|---|
| CN | 115088249 | A | 9/2022 |
| EP | 3845970 | A1 | 7/2021 |
| JP | 2021-110866 | A | 8/2021 |

OTHER PUBLICATIONS

Extended European Search Report, dated Jan. 14, 2025, for application No. 24191541.2, 10 pages.
Friedman and Shaked. “Hybrid reflective interferometric system combining wide-field and single-point phase measurements.” IEEE Photonics Journal 7, No. 3 (2015): 1-13.
Taiwanese Search Report for application No. 113129977, mailed Jan. 17, 2025, with machine generated English translation, 13 pages.
Zhang, Jiwei, Siqing Dai, Chaojie Ma, Teli Xi, Jianglei Di, and Jianlin Zhao. “A review of common-path off-axis digital holography: towards high stable optical instrument manufacturing.” Light: advanced manufacturing 2, No. 3 (2021): 333-349.
Japanese Office Action, dated Jun. 10, 2025, for Japanese application No. 2024-124887, with machine generated English translation, 7 pages.

* cited by examiner

SYSTEM AND METHOD FOR HIGH-RESOLUTION REFLECTION TOMOGRAPHIC IMAGING

CROSS-REFERENCE TO RELATED APPLICATION(S)

This application claims the priority benefit of Korean Patent Application No. 10-2023-0105750, filed on Aug. 11, 2023, in the Korean Intellectual Property Office, the disclosure of which is incorporated herein by reference.

BACKGROUND

1. Field of the Invention

The present disclosure relates to a system and method for high-resolution reflection tomographic imaging.

2. Description of the Related Art

Optical inspection techniques are essential to manufacturing and quality assurance processes of semiconductors and display devices. Such techniques provide non-destructive methods for evaluating integrity and quality of products, thereby helping to ensure performance and reliability of the products. Two pivotal techniques are confocal microscopy and white light interferometry (WLI). These techniques allow high-resolution imaging and surface profiling, enabling precise inspection of device structures and materials. Confocal microscopy offers the advantage of depth sectioning and improved resolution, which is essential for detailed fault detection. Meanwhile, the WLI provides accurate 3D surface topography and measures thin-film thickness, which is a crucial aspect in semiconductor and display device inspection.

Depth-resolved reflection measurements are primarily based on three technologies, for example, white light interferometry (WLI), reflection confocal microscopy (or confocal reflection microscopy), and optical coherence tomography. Reflection confocal microscopy and optical coherence tomography rely mainly on focus scanning, which is slow and challenging to implement. This limitation has led to the development of white light interferometry (WLI) methods that enable acquisition of the full field of view without scanning. WLI is based on two interferometric configurations as shown in FIGS. 1A and 1B. The first configuration utilizes a specialized objective lens called Mirau objective lens. However, the Mirau objective lenses have a limited resolution and a lack aberration correction. Also, the Mirau objective lenses are commercially available only for visible wavelengths. When using a regular objective lens, an alternative configuration is Linnik interferometer configuration. This setup employs two objective lenses around a beam splitter to generate a sample and a reference beam. While this configuration provides flexibility in selecting optics, the configuration requires precise alignment and may not be compatible with every microscope.

Confocal microscopy works using a point illumination and a pinhole in an optically conjugate plane in front of a detector to eliminate out-of-focus signals. This results in high-resolution images and allows 3D surface profiling. However, it may be slower than other imaging techniques due to its point-by-point scanning process. WLI uses interference of white light to measure surface heights with nanometer precision. However, its precision may be affected by surface reflectivity variations and adequate results may not be provided on surfaces that are not optically smooth or are highly reflective. Recently, quantitative phase imaging technique was demonstrated in reflection geometry, but the use of spatial and temporal coherent light does not provide depth-selective imaging.

SUMMARY

Demands for tomographic high-resolution non-destructive imaging are increasing. Inspection systems need to be capable of providing three-dimensional internal images of semiconductors and display devices as well as surface profiles. Through this, inspection of multilayer structures may be performed in a non-destructive manner. Also, the ability to analyze and quantify characteristics at a nanoscale level and an increase in automation and speed of inspection will be key features to meet the challenges of ever-decreasing device dimensions and increasingly complex architectures. In summary, future optical inspection techniques need to deliver more detailed insight into device structures and materials more quickly and more efficiently, to keep pace with the rapidly evolving semiconductor and display industries.

Therefore, the present disclosure proposes a system that utilizes temporally coherent and spatially incoherent light to perform quantitative phase image measurements of reflection signals. Quantitative phase image information provides information on a surface profile of a reflective surface. This is achieved by generating a reference beam on a conjugate image plane far from a sample. By employing off-axis detection, a signal may be measured in a single shot. A configuration of the present disclosure eliminates the need for a specific objective lens and may be designed as an add-on to a camera port of any microscope. The use of a high numerical aperture objective lens with temporally coherent and spatially incoherent light may have an optical sectioning function of enabling the synthesis of tomographic reconstruction of a 3D object by scanning a sample or an objective lens or a virtual focusing lens in an axial direction and acquiring optically sectioned quantitative phase imaging at various axial positions.

The present disclosure provides a high-resolution reflection tomographic imaging system and method.

A high-resolution reflection tomographic imaging system of the present disclosure may include an objective lens, a tube lens, a camera, an illumination element configured to introduce temporally coherent and spatially incoherent light, and a semi-reflective surface element configured to split the light into a sample and a reference beam between the tube lens and the camera, such that a sample beam from the sample and the reference beam cause interference for tomographic imaging.

A high-resolution reflection tomographic imaging system of the present disclosure may include a microscope device including an objective lens and a tube lens and formed with a camera port and a camera device including a camera and attachable to the camera port, and the camera device may further include an illumination element configured to introduce temporally coherent and spatially incoherent light and a semi-reflective surface element configured to split the light into a sample and a reference beam between the tube lens and the camera, such that a sample beam from the sample and the reference beam cause interference for tomographic imaging.

An operating method of a high-resolution reflection tomographic imaging system with an objective lens, a tube lens, and a camera of the present disclosure may include introducing, by an illumination element, temporally coherent and spatially incoherent light, splitting, by a semi-reflective surface element between the tube lens and the camera, the light into a sample and a reference beam, and acquiring, by the camera, a three-dimensional (3D) image for tomographic imaging based on interference caused by a sample beam from the sample and the reference beam.

The present disclosure provides a high-resolution reflection tomographic imaging system based on an optical setup that enables reflection quantitative phase imaging measurement of a sample and an operating method thereof. In the optical setup of the present disclosure, since temporally coherent and spatially incoherent light is used, interference may occur although a reference beam and a sample beam do not have the same path length. Therefore, the optical setup of the present disclosure may acquire a 3D image for tomographic imaging based on interference caused by the sample beam and the reference beam. Accordingly, the optical setup of the present disclosure may have the following advantages. First, since the optical setup of the present disclosure uses only one general-use objective lens, a high numerical aperture objective lens and an immersion objective lens may be used. Lenses with spherical aberration compensation may also be used for an image sample behind cover glass. Second, since reflection is generated on a magnified image plane, the setup is much easier to align than Linnik or Mirau interferometer configuration. Third, since optical path lengths of the sample beam and the reference beam do not need to be matched, the setup may be manufactured into a camera device attachable to a camera port of a commercial microscope.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, various embodiments of the present disclosure are described with reference to the accompanying drawings.

In the present disclosure, a proposed optical setup for reflection quantitative phase imaging measurement of a sample has a reference beam moved far from a sample on a conjugate image plane. Contrary to traditional white light interferometry (WLI) or full-field optical coherence tomography in which temporally incoherent light is used and a reference beam and a sample beam need to have the same path length, here, spatially incoherent but temporally coherent light enables interference to occur although the reference beam and the sample beam do not have the same path length. The present disclosure employs this property to move the semi-reflective surface that generates the reference beam on the conjugate image plane. This configuration may make it possible to use system demagnification to slightly tilt the reference beam that enables off-axis signal measurement. The use of spatially incoherent light has been used before for interferometric reflectance measurement, but its configuration was limited to Linnik interferometer configuration. Here, off-axis measurement was also proposed but required a complex optical setup or compromised the numerical aperture.

Figure 1A:
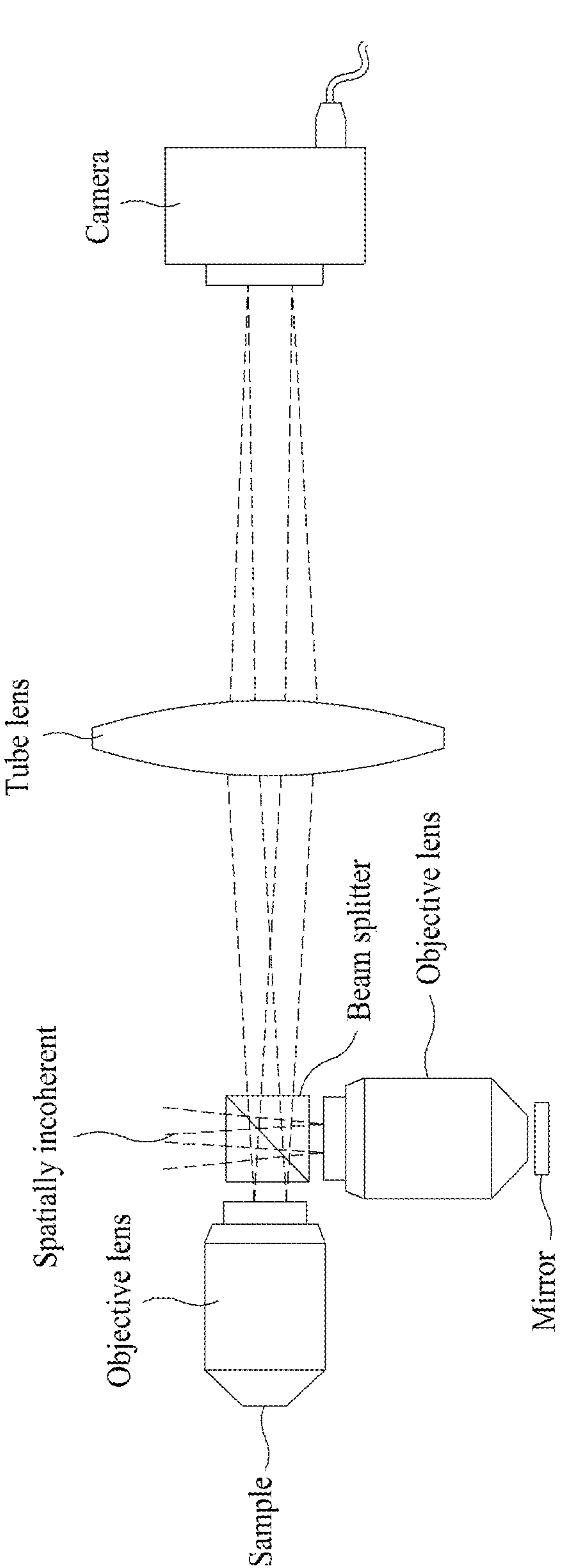
FIG. 1A illustrates Mirau interferometer configuration according to the related art.
Figure 1B:
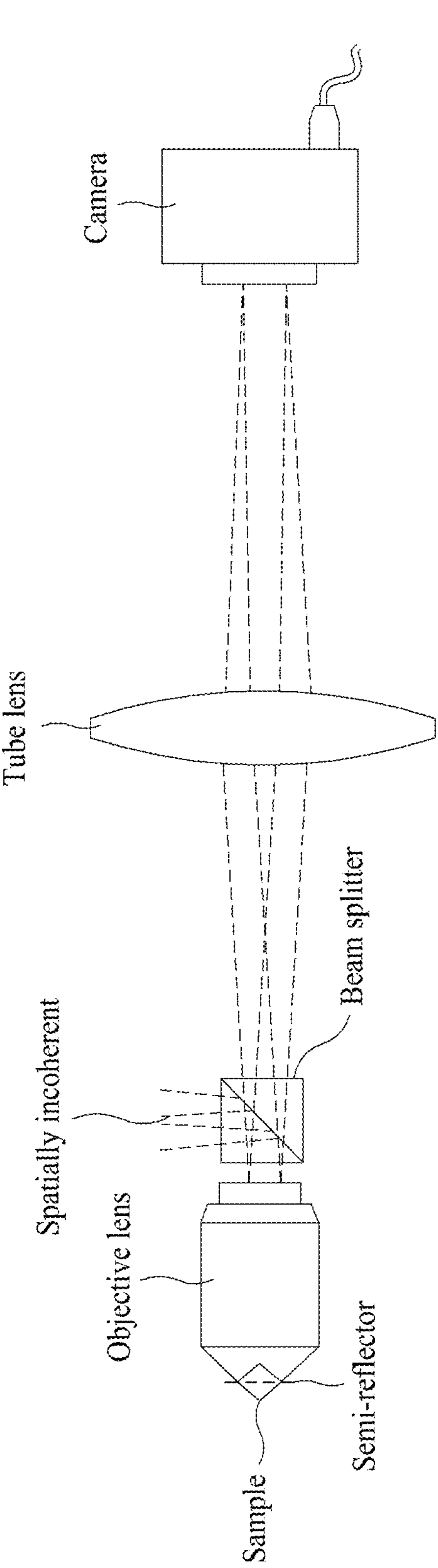
FIG. 1B illustrates Linnik Interferometer configuration according to the related art.
Figure 2:
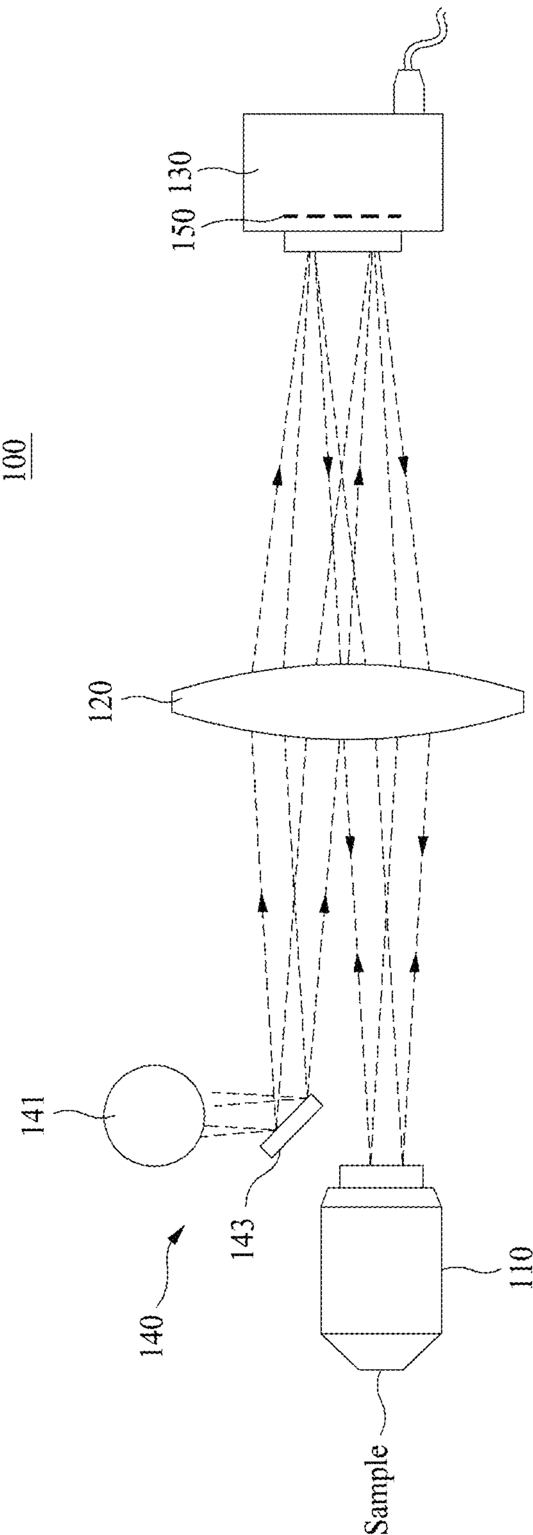
FIG. 2 illustrates a high-resolution reflection tomographic imaging system according to a first embodiment.

FIG. 2 illustrates a high-resolution reflection tomographic imaging system 100 according to a first embodiment.

Referring to FIG. 2, the high-resolution reflection tomographic imaging system 100 may include an objective lens 110, a tube lens 120, a camera 130, an illumination element 140, and a semi-reflective surface element 150.

The objective lens 110, the tube lens 120, and the camera 130 are components for an optical setup of a typical microscope. The objective lens 110 is close to a sample and may magnify the sample. The tube lens 120 is provided between the objective lens 110 and the camera 130 and may image an image related to the sample on the camera 130. The camera 130 may acquire the image.

The illumination element 140 may introduce temporally coherent and spatially incoherent light into the high-resolution reflection tomographic imaging system 100. In an embodiment, as illustrated, the illumination element 140 may include a light source 141 and a small mirror 143. The light source 141 may generate the temporally coherent and spatially incoherent light. The mirror 143 may reflect the light generated from the light source 141 toward the semi-reflective surface element 150. For example, the mirror 143 may be provided to face the semi-reflective surface element 150 based on the tube lens 120. Therefore, the tube lens 120 may project the light from the illumination element 140 onto the semi-reflective surface element 150. In another embodiment, although not illustrated, the illumination element 140 may include a beam splitter instead of the mirror 143. The beam splitter may reflect a portion of the light generated from the light source 141 toward the semi-reflective surface element 150.

The semi-reflective surface element 150 may be provided between the tube lens 120 and the camera 130. In this embodiment, the semi-reflective surface element 150 may be coupled to a camera sensor of the camera 130 and may make a direct contact with the camera sensor. The semi-reflective surface element 150 may split the light from the illumination element 140 into a sample and a reference beam, such that a sample beam from the sample and the reference beam cause interference for tomographic imaging. In detail, the semi-reflective surface element 150 may generate the sample beam by providing a portion of the light from the illumination element 140 as the sample through the objective lens 110. Here, the semi-reflective surface element 150 may reflect the corresponding light toward the tube lens 120 such that the corresponding light is provided as the sample through the tube lens 120 and the objective lens 110 and generated as the sample beam. Therefore, the tube lens 120 may project the sample beam onto the semi-reflective surface element 150. In addition, the semi-reflective surface element 150 may generate the reference beam with the remainder of the light from the illumination element 140. As a result, the sample beam and the reference beam may have different path lengths, but may cause inference. Therefore, the camera 130 may acquire a 3D image for tomographic imaging based on the interference caused by the sample beam and the reference beam. For example, the semi-reflective surface element 150 may be selected from among various optical elements, such as a half mirror, a plate beam splitter, a wide-grid polarizer, a cube beam splitter with a mirror, or any other semi-reflective surface elements.

Figure 3:
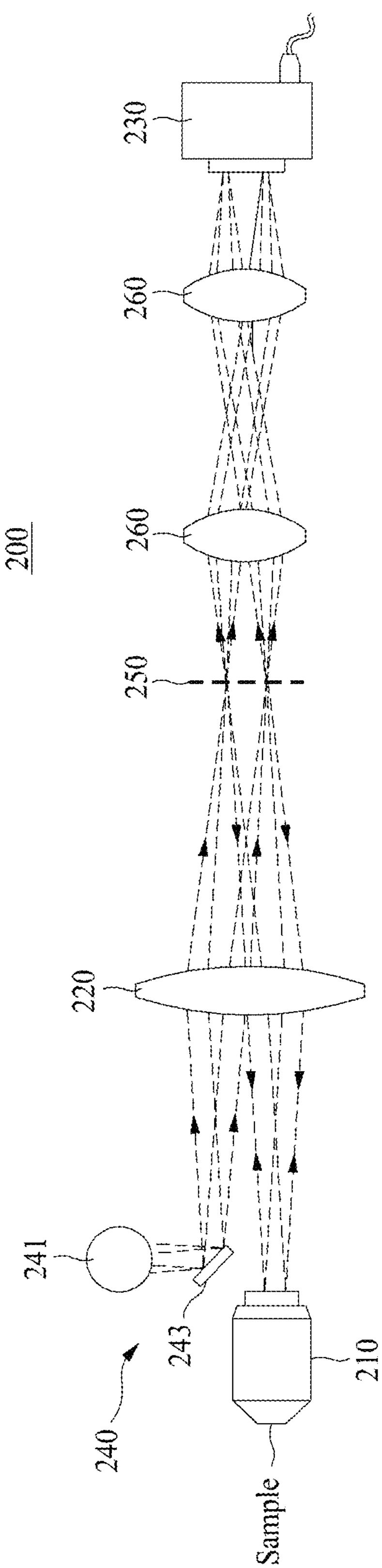
FIG. 3 illustrates a high-resolution reflection tomographic imaging system according to a second embodiment.

FIG. 3 illustrates a high-resolution reflection tomographic imaging system 200 according to a second embodiment.

Referring to FIG. 3, the high-resolution reflection tomographic imaging system 200 may include an objective lens 210, a tube lens 220, a camera 230, an illumination element 240, a semi-reflective surface element 250, and relay lenses 260. In this embodiment, the objective lens 210, the tube lens 220, the camera 230, and the illumination element 240 may be substantially similar to the objective lens 110, the tube lens 120, the camera 130, and the illumination element 140 of the first embodiment, respectively, and thus, further description related thereto is omitted.

The semi-reflective surface element 250 may be provided between the tube lens 220 and the camera 230. In this embodiment, the semi-reflective surface element 250 may be provided on a conjugate image plane between the tube lens 220 and the camera 230. The semi-reflective surface element 250 may split the light from the illumination element 240 into a sample and a reference beam, such that a sample beam from the sample and the reference beam cause interference for tomographic imaging. In detail, the semi-reflective surface element 250 may generate the sample beam by providing a portion of the light from the illumination element 240 as the sample through the objective lens 210. Here, the semi-reflective surface element 250 may reflect the corresponding light toward the tube lens 220 such that the corresponding light is provided as the sample through the tube lens 220 and the objective lens 210 and generated as the sample beam. Therefore, the tube lens 220 may project the sample beam onto the semi-reflective surface element 250. In addition, the semi-reflective surface element 250 may generate the reference beam with the remainder of the light from the illumination element 240. As a result, the sample beam and the reference beam may have different path lengths, but may cause interference. For example, the semi-reflective surface element 250 may be selected from among various optical elements, such as a half mirror, a plate beam splitter, a wide-grid polarizer, a cube beam splitter with a mirror, or any other semi-reflective surface elements.

The relay lenses 260 may be provided between the semi-reflective surface element 250 and the camera 230. The relay lenses 260 may project the interference caused by the sample beam and the reference beam onto a camera sensor of the camera 230. Accordingly, the camera 230 may acquire a 3D image for tomographic imaging based on the interference caused by the sample beam and the reference beam.

Figure 4:
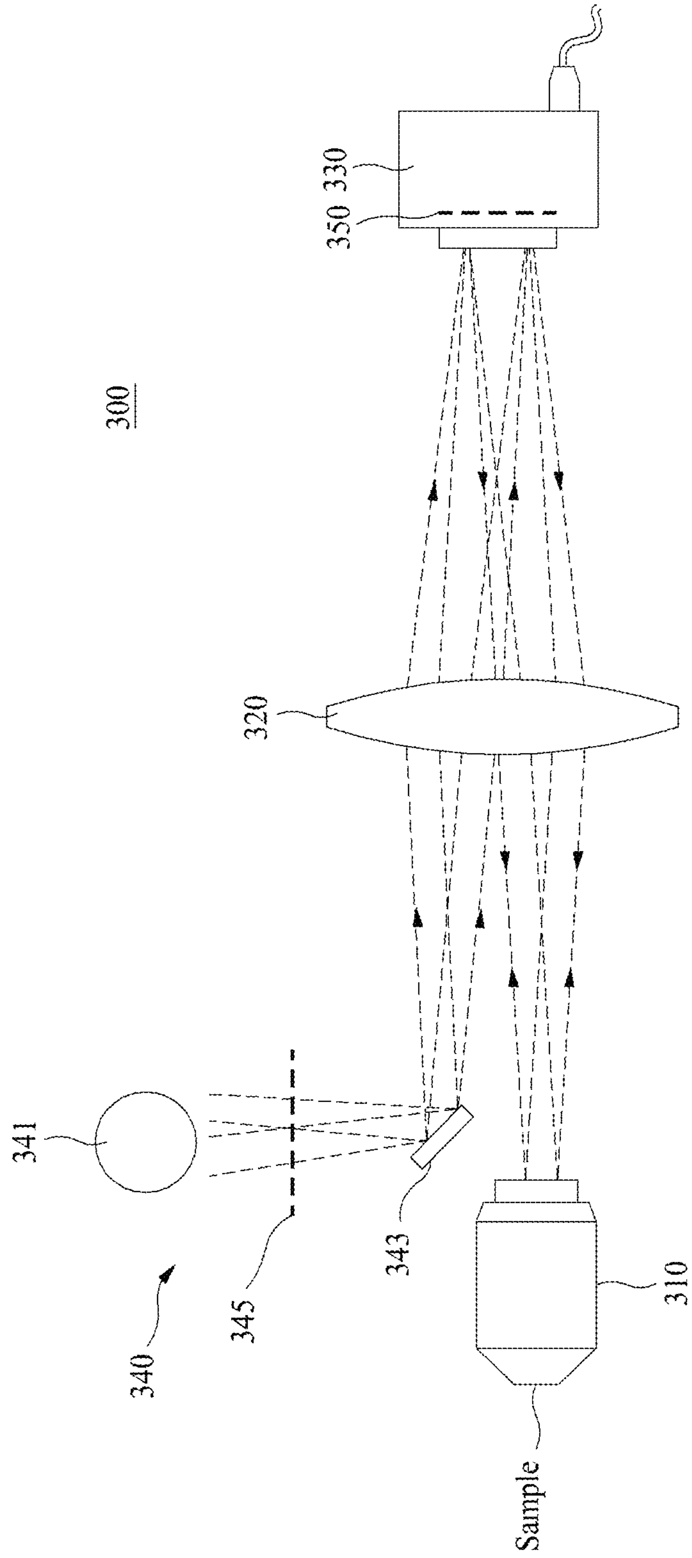
FIG. 4 illustrates a high-resolution reflection tomographic imaging system according to a third embodiment.

FIG. 4 illustrates a high-resolution reflection tomographic imaging system 300 according to a third embodiment.

Referring to FIG. 4, the high-resolution reflection tomographic imaging system 300 may include an objective lens 310, a tube lens 320, a camera 330, an illumination element 340, and a semi-reflective surface element 350. In this embodiment, the objective lens 310, the tube lens 320, the camera 330, and the semi-reflective surface element 350 may be substantially similar to the objective lens 110, the tube lens 120, the camera 130, and the semi-reflective surface element 150 of the first embodiment, respectively. In this case, the semi-reflective surface element 350 may be coupled to a camera sensor of the camera 330 and may make a direct contact with the camera sensor. Meanwhile, dissimilar to the illustration, in this embodiment, the objective lens 310, the tube lens 320, the camera 330, and the semi-reflective surface element 350 may be substantially similar to the objective lens 210, the tube lens 220, the camera 230, and the semi-reflective surface element 250 of the second embodiment, respectively. In this case, the semi-reflective surface element 350 may be provided on a conjugate image plane between the tube lens 320 and the camera 330, and relay lenses (not shown) may be additionally provided between the semi-reflective surface element 350 and the camera 330.

The illumination element 340 may introduce temporally coherent and spatially incoherent light into the high-resolution reflection tomographic imaging system 300. In an embodiment, as illustrated, the illumination element 340 may include a light source 341, a small mirror 343, and a wavefront shaper 345. Here, in this embodiment, the light source 341 and the mirror 343 are substantially similar to the light source 141 and the mirror 143 of the first embodiment, respectively, and thus, further description related thereto is omitted. The wavefront shaper 345 may be provided between the light source 341 and the mirror 343. The wavefront shaper 345 may be used to modulate an illumination pattern in order to minimize aberration used in the high-resolution reflection tomographic imaging system 300 and/or to optimize an optical transfer function of the high-resolution reflection tomographic imaging system 300. In another embodiment, although not illustrated, the illumination element 340 may include a beam splitter instead of the mirror 343. The beam splitter may reflect a portion of the light generated from the light source 341 toward the semi-reflective surface element 350.

Figure 5:
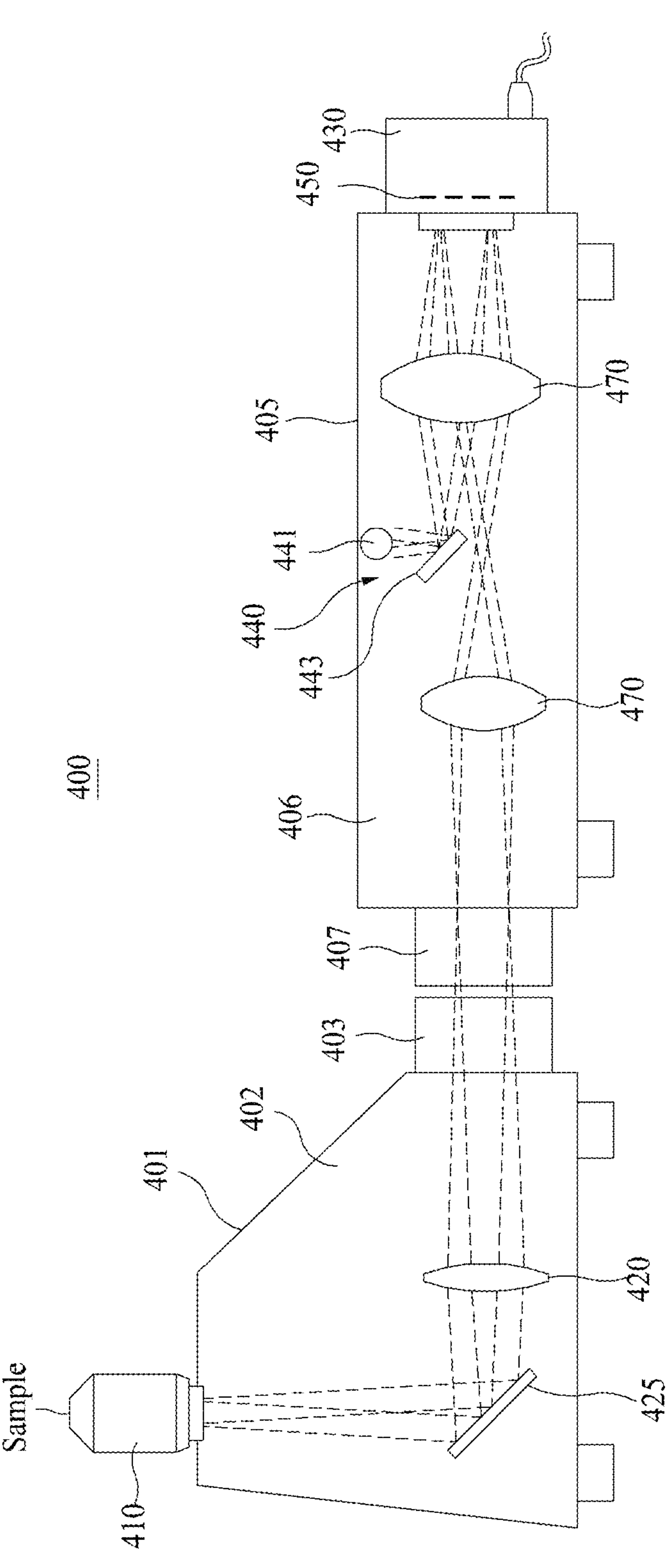
FIG. 5 illustrates a high-resolution reflection tomographic imaging system according to a fourth embodiment.

FIG. 5 illustrates a high-resolution reflection tomographic imaging system 400 according to a fourth embodiment.

Referring to FIG. 5, the high-resolution reflection tomographic imaging system 400 may include a microscope device 401 and a camera device 405, and the camera device 405 is attachable to the microscope device 401. The microscope device 401 may include a microscope body 402 and a first camera port 403. The microscope body 402 may include an objective lens 410 and a tube lens 420. Optionally, the microscope body 402 may further include at least one mirror 425 between the objective lens 410 and the tube lens 420. The first camera port 403 may be formed on one side of the microscope body 402. The camera device 405 may include a camera body 406 and a second camera port 407. The camera body 406 may include a camera 430, an illumination element 440, a semi-reflective surface element 450, and relay lenses 470. The second camera port 407 may be formed on one side of the camera body 406. Here, the second camera port 407 is attachable to the first camera port 403 and, in response to the second camera port 407 being attached to the first camera port 403, the camera device 405 may be coupled to the microscope device 401.

The objective lens 410, the tube lens 420, and the camera 430 are components for an optical setup of a typical microscope. The objective lens 410 is close to a sample and may magnify the sample. The tube lens 420 is provided between the objective lens 410 and the camera 430 and may image an image related to the sample on the camera 430. The camera 430 may acquire the image.

The illumination element 440 may introduce temporally coherent and spatially incoherent light into the high-resolution reflection tomographic imaging system 400. In an embodiment, as illustrated, the illumination element 440 may include a light source 441 and a small mirror 443. The light source 441 may generate the temporally coherent and spatially incoherent light. The mirror 443 may reflect the light generated from the light source 441 toward the semi-reflective surface element 450. For example, the mirror 443 may be provided to face the semi-reflective surface element 450 based on a single relay lens 470. Therefore, the corresponding relay lens 470 may project the light from the illumination element 440 onto the semi-reflective surface element 450. In another embodiment, although not illustrated, the illumination element 440 may include a beam splitter instead of the mirror 443. The beam splitter may reflect at least a portion of the light generated from the light source 441 toward the semi-reflective surface element 450. As another embodiment, although not illustrated, the illumination element 440 may further include a wavefront shaper. The wavefront shaper may be provided between the light source 441 and the mirror 443 or the beam splitter.

The semi-reflective surface element 450 may be provided between the tube lens 420 and the camera 430. In this embodiment, the semi-reflective surface element 450 may be coupled to a camera sensor of the camera 430 and may make a direct contact with the camera sensor. The semi-reflective surface element 450 may split the light from the illumination element 440 into a sample and a reference beam, such that a sample beam from the sample and the reference beam cause interference for tomographic imaging. In detail, the semi-reflective surface element 450 may generate the sample beam by providing a portion of the light from the illumination element 440 as the sample through the tube lens 420 and the objective lens 410. Here, the semi-reflective surface element 450 may reflect the corresponding light toward the tube lens 420 such that the corresponding light is provided as the sample through the objective lens 410 and generated as the sample beam. In addition, the semi-reflective surface element 450 may generate the reference beam with the remainder of the light from the illumination element 440. As a result, the sample beam and the reference beam may have different path lengths, but may cause inference. Therefore, the camera 430 may acquire a 3D image for tomographic imaging based on the interference caused by the sample beam and the reference beam. For example, the semi-reflective surface element 450 may be selected from among various optical elements, such as a half mirror, a plate beam splitter, a wide-grid polarizer, a cube beam splitter with a mirror, or any other semi-reflective surface elements.

The relay lenses 470 may be provided between the tube lens 420 and the semi-reflective surface element 450. Here, one of the relay lenses 470 may be provided between the illumination element 440 and the semi-reflective surface element 450. The relay lenses 470 may project the interference caused by the sample beam and the reference beam onto the camera sensor of the camera 430 along with the tube lens 420. Therefore, the camera 430 may acquire a 3D image for tomographic imaging based on the interference caused by the sample beam and the reference beam. Meanwhile, dissimilar to the illustration, in this embodiment, the semi-reflective surface element 450 may be provided on a conjugate image plane between the tube lens 420 and the camera 430. In this case, additional relay lenses (not shown) may be further provided between the semi-reflective surface element 450 and the camera 430. The additional relay lenses may be provided between the semi-reflective surface element 450 and the camera 430. The additional relay lenses may project the interference caused by the sample beam and the reference beam onto the camera sensor of the camera 430.

Figure 6:
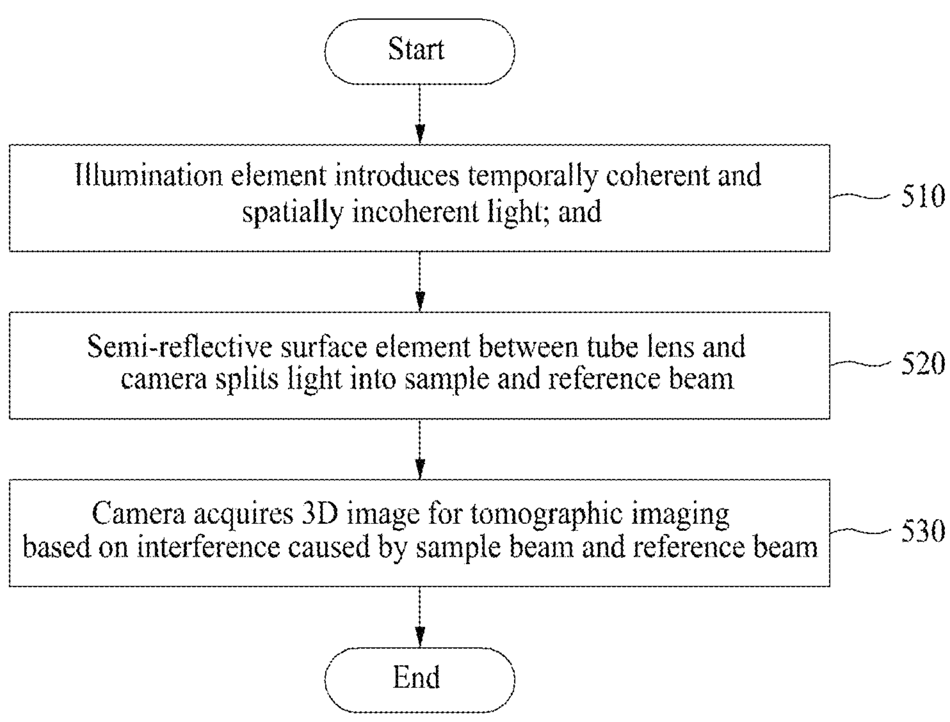
FIG. 6 is a flowchart illustrating an operating method of a high-resolution reflection tomographic imaging system according to various embodiments.

FIG. 6 is a flowchart illustrating an operating method of the high-resolution reflection tomographic imaging system 100, 200, 300, 400 according to various embodiments.

Referring to FIG. 6, in operation 510, the illumination element 140, 240, 340, 440 may introduce temporally coherent and spatially incoherent light. In detail, the light source 141, 241, 341, 441 may generate the temporally coherent and spatially incoherent light. Then, the mirror 143, 243, 343, 443 or the beam splitter (not shown) may reflect the light generated from the light source 141, 241, 341, 441 toward the semi-reflective surface element 150, 250, 350, 450. Therefore, the light from the illumination element 140, 240, 340, 440 may be projected onto the semi-reflective surface element 150, 250, 350, 450.

In operation 520, the semi-reflective surface element 150, 250, 350, 450 between the tube lens 120, 220, 320, 420 and the camera 130, 230, 330, 430 may split the light into a sample and a reference beam. The semi-reflective surface element 150, 250, 350, 450 may split the light from the illumination element 140, 240, 340, 440 into the sample and the reference beam, such that a sample beam from the same and the reference beam cause interference for tomographic imaging. In detail, the semi-reflective surface element 150, 250, 350, 450 may generate the sample beam by providing a portion of the light from the illumination element 140, 240, 340, 440 as the sample through the objective lens 110, 210, 310, 410. Here, the semi-reflective surface element 150, 250, 350, 450 may reflect the corresponding light toward the tube lens 120, 220, 320, 420 such that the corresponding light is provided as the sample through the tube lens 120, 220, 320, 420 and the objective lens 110, 210, 310, 410 and generated as the sample beam. Therefore, the, tube lens 120, 220, 320, 420 may project the sample beam onto the semi-reflective surface element 150, 250, 350, 450. In addition, the semi-reflective surface element 150, 250, 350, 450 may generate the reference beam with the remainder of the light from the illumination element 140, 240, 340, 440. As a result, the sample beam and the reference beam may have different path lengths, but may cause inference.

In operation 530, the camera 130, 230, 330, 430 may acquire a 3D image for tomographic imaging based on the interference caused by the sample beam and the reference beam. Some of notable advantages of the optical setup of the present disclosure may be as follows.

First is a numerical aperture. In Mirau interferometer configuration, the numerical aperture may be often limited due to the need for a long working distance of an objective lens. However, since the optical setup of the present disclosure uses only one general-use objective lens, a high numerical aperture objective lens and an immersion objective lens may be used. Lenses with spherical aberration compensation may also be used for an image sample behind cover glass.

Second is robustness to alignment. Since reflection is generated on a magnified image plane, the setup is much easier to align than Linnik or Mirau interferometer configuration. The semi-reflective surface element 150, 250, 350, 450 may be typically provided within 100 μm without performance lost, while, for the Linnik and Mirau interferometer configuration, a semi-reflector needs to be provided with a precision of about 1μ m.

Third is a microscope device. Since the sample beam and the reference beam do not need to have the same optical path, the setup may be manufactured into a camera device (camera device 405 of FIG. 5) attachable to a camera port of a commercial microscope (microscope device 401 of FIG. 5) as in the fourth embodiment.

Figure 7:
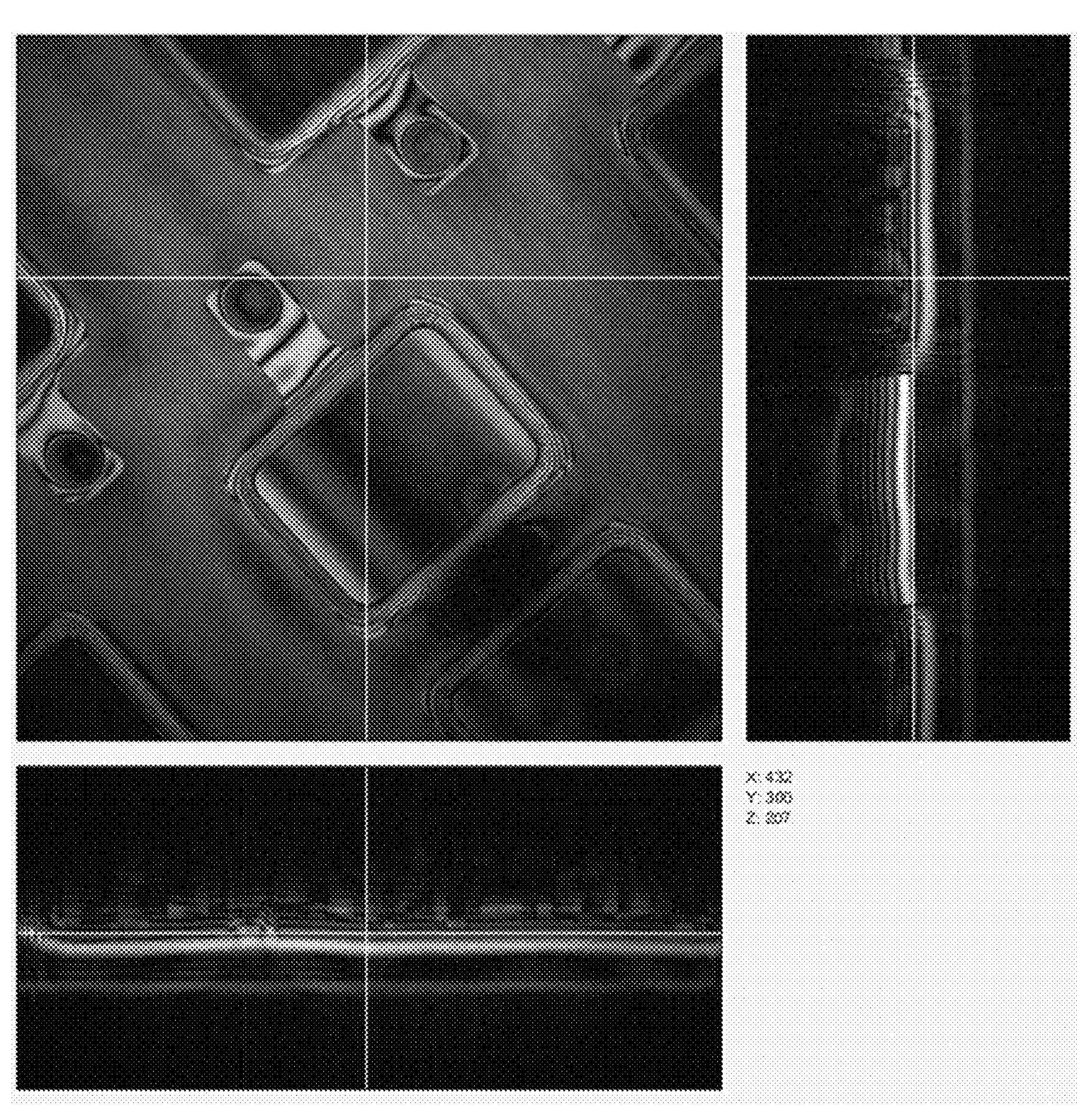
FIG. 7 illustrates examples of a tomographic image of a micropatterned micro electric device acquired with a high-resolution reflection tomographic imaging system according to various embodiments.

A novel method for interferometric measurement of sample reflectance as in the present disclosure holds significant importance in the industrial application fields. FIG. 7 illustrates examples of a tomographic image of a micropatterned micro electric device acquired with the high-resolution reflection tomographic imaging system 100, 200, 300, 400 according to various embodiments.

The present disclosure works for any wavelength of electromagnetic waves. For example, the use of a shorter wavelength, such as ultraviolet (UV) light, may allow a higher imaging resolution compared to a case of using a visible wavelength. Its adaptability to use high numerical aperture and UV light makes it particularly valuable in the semiconductor industry in which a high resolution is crucial. Also, this optical configuration proves useful in industries that require measurement of samples behind glass, such as biological sample observation and display manufacturing. Unlike traditional Mirau interferometry, the optical setup of the present disclosure may allow for correction of spherical aberrations by rotating correction collar. Another advantage of the optical setup of the present disclosure is its capability to be manufactured as a device that may be easily attached to a camera port of any microscope. This feature enables convenient and simultaneous use with other microscopy modalities, enhancing its versatility and potential for parallel imaging applications.

That is, the present disclosure provides the high-resolution reflection tomographic imaging system 100, 200, 300, 400 and an operating method thereof.

The high-resolution reflection tomographic imaging system 100, 200, 300, 400 of the present disclosure may include the objective lens 110, 210, 310, 410, the tube lens 120, 220, 320, 420, the camera 130, 230, 330, 430, the illumination element 140, 240, 340, 440 configured to introduce temporally coherent and spatially incoherent light, and the semi-reflective surface element 150, 250, 350, 450 configured to split the light into a sample and a reference beam between the tube lens 120, 220, 320, 420 and the camera 130, 230, 330, 430, such that a sample beam from the sample and the reference beam cause interference for tomographic imaging.

According to various embodiments, the illumination element 140, 240, 340, 440 may include the light source 141, 241, 341, 441 configured to generate the light, and at least one of the mirror 143, 243, 343, 443 and the beam splitter configured to reflect the light from the light source 141, 241, 341, 441 toward the semi-reflective surface element 150, 250, 350, 450.

According to an embodiment, the illumination element 340 may further include the wavefront shaper 345 provided between the light source 341 and the mirror 343 or the beam splitter.

According to an embodiment, the semi-reflective surface element 150, 350, 450 may be coupled to the camera sensor of the camera 130, 330, 430.

According to another embodiment, the semi-reflective surface element 250 may be provided on a conjugate image plane between the tube lens 220 and the camera 230.

According to another embodiment, the high-resolution reflection tomographic imaging system 200 may further include relay lenses provided between the semi-reflective surface element 250 and the camera 230.

According to various embodiments, the semi-reflective surface element 150, 250, 350, 450 may generate the sample beam by providing a portion of the light as the sample and may generate the reference beam with the remainder of the light, and the camera 130, 230, 330, 430 may acquire a 3D image for tomographic imaging based on the interference caused by the sample beam and the reference beam.

The high-resolution reflection tomographic imaging system 400 of the present disclosure may include the microscope device 401 including the objective lens 410 and the tube lens 420, and formed with the camera port 403 and the camera device 405 including the camera 430 and attachable to the camera port 403.

According to various embodiments, the camera device 405 may further include the illumination element 440 configured to introduce temporally coherent and spatially incoherent light, and the semi-reflective surface element 450 configured to split the light into a sample and a reference beam between the tube lens 420 and the camera 430, such that a sample beam from the sample and the reference beam cause interference for tomographic imaging.

According to an embodiment, the semi-reflective surface element 450 may be coupled to the camera sensor of the camera 430, and the camera device 405 may further include the relay lenses 470 provided between the tube lens 420 and the semi-reflective surface element 450.

According to another embodiment, the semi-reflective surface element 450 may be provided on a conjugate image plane between the tube lens 420 and the camera 430, and the camera device 405 may further include the relay lenses 470 provided between the tube lens 420 and the semi-reflective surface element 450 and the relay lenses 470 provided between the semi-reflective surface element 450 and the camera 430.

The operating method of the high-resolution reflection tomographic imaging system 100, 200, 300, 400 with the objective lens 110, 210, 310, 410, the tube lens 120, 220, 320, 420, and the camera 130, 230, 330, 430 of the present disclosure may include introducing, by the illumination element 140, 240, 340, 440, temporally coherent and spatially incoherent light (operation 510), splitting, by the semi-reflective surface element 150, 250, 350, 450 between the tube lens 120, 220, 320, 420 and the camera 130, 230, 330, 430, the light into a sample and a reference beam (operation 520), and acquiring, by the camera 130, 230, 330, 430, a 3D image for tomographic imaging based on interference caused by a sample beam from the sample and the reference beam (operation 530).

Various embodiments of the present disclosure and the terms used herein are not construed to limit description disclosed herein to a specific implementation and should be understood to include various modifications, equivalents, and/or substitutions of a corresponding embodiment. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe corresponding components regardless of order or importance and the terms are simply used to distinguish one component from another component. The components should not be limited by the terms. When a component (e.g., a first component) is described to be "(functionally or communicatively) connected to" or "accessed to" another component (e.g., a second component), the component may be directly connected to the other component or may be connected through still another component (e.g., a third component).

According to various embodiments, each of the components may include a singular object or a plurality of objects. According to various embodiments, at least one of the components or operations may be omitted. Alternatively, at least one another component or operation may be added. Alternatively or additionally, a plurality of components may be integrated into a single component. In this case, the integrated component may perform one or more functions of each of the components in the same or similar manner as it is performed by a corresponding component before integration. According to various embodiments, operations performed by a module, a program, or another component may be performed in a sequential, parallel, iterative, or heuristic manner. Alternatively, at least one of the operations may be performed in different sequence or omitted. Alternatively, at least one another operation may be added.

What is claimed is:

1. A high-resolution reflection tomographic imaging system with an objective lens, a tube lens, and a camera, comprising:

an illumination element comprising a wavefront shaper, the illumination element configured to introduce temporally coherent and spatially incoherent light formed by the wavefront shaper; and a semi-reflective surface element configured to split the light into a sample beam from a sample and a reference beam between the tube lens and the camera, such that the sample beam and the reference beam cause interference for tomographic imaging, wherein the semi-reflective surface element is coupled to a camera sensor of the camera and contacts the camera sensor, and wherein the semi-reflective surface element is configured to reflect a first light, being a portion of the light, toward the tube lens such that the first light is provided to the sample through the tube lens and the objective lens to generate the sample beam, and to generate the reference beam with a second light, being the remainder of the light other than the first light, whereby the sample beam and the reference beam have different path lengths.

2. The high-resolution reflection tomographic imaging system of claim 1, wherein the illumination element comprises:

a light source configured to generate the light; and at least one of a mirror and a beam splitter configured to reflect the light from the light source toward the semi-reflective surface element.

3. The high-resolution reflection tomographic imaging system of claim 2, wherein the wavefront shaper is provided between the light source and the mirror or the beam splitter.

4. The high-resolution reflection tomographic imaging system of claim 1, wherein the camera is configured to acquire a three-dimensional (3D) image for the tomographic imaging based on the interference caused by the sample beam and the reference beam.

5. A high-resolution reflection tomographic imaging system comprising:

a microscope device comprising an objective lens and a tube lens, and formed with a camera port; and a camera device comprising a camera including a camera sensor and attachable to the camera port, wherein the camera device further comprises:

an illumination element comprising a wavefront shaper, the illumination element configured to introduce temporally coherent and spatially incoherent light formed by the wavefront shaper; and a semi-reflective surface element configured to split the light into a sample beam from a sample and a reference beam between the tube lens and the camera, such that the sample beam and the reference beam cause interference for tomographic imaging, wherein the semi-reflective surface element is coupled to the camera sensor and contacts the camera sensor, and wherein the semi-reflective surface element is configured to reflect a first light, being a portion of the light, toward the tube lens such that the first light is provided to the sample through the tube lens and the objective lens to generate the sample beam, and to generate the reference beam with a second light, being the remainder of the light other than the first light, whereby the sample beam and the reference beam have different path lengths.

6. The high-resolution reflection tomographic imaging system of claim 5, wherein the camera device further comprises relay lenses provided between the tube lens and the semi-reflective surface element.

7. An operating method of a high-resolution reflection tomographic imaging system with an objective lens, a tube lens, and a camera, the method comprising:

introducing, by an illumination element comprising a wavefront shaper, temporally coherent and spatially incoherent light formed by the wavefront shaper;

splitting, by a semi-reflective surface element between the tube lens and the camera, the light into a sample beam from a sample and a reference beam; and acquiring, by the camera, a three-dimensional (3D) image for tomographic imaging based on interference caused by the sample beam and the reference beam, wherein the semi-reflective surface element is coupled to a camera sensor of the camera and contacts the camera sensor, and wherein the semi-reflective surface element is configured to reflect a first light, being a portion of the light, toward the tube lens such that the first light is provided to the sample through the tube lens and the objective lens to generate the sample beam, and to generate the reference beam with a second light, being the remainder of the light other than the first light, whereby the sample beam and the reference beam have different path lengths.

* * * * *